United States Patent
Arai et al.

(12) 
(10) Patent No.: US 6,170,624 B1
(45) Date of Patent: Jan. 9, 2001

(54) APPARATUS FOR ENGAGING AND DISENGAGING CLUTCH

(75) Inventors: Hiroyuki Arai; Kazuhiko Kobayashi; Nobuo Sugamura, all of Kawasaki (JP)

(73) Assignees: Isuzu Motors Limited, Tokyo; Transtron, Inc., Kanagawa, both of (JP)

( * ) Notice: Under 35 U.S.C. 154(b), the term of this patent shall be extended for 0 days.

(21) Appl. No.: 09/242,629

(22) PCT Filed: Jun. 19, 1998

(86) PCT No.: PCT/JP98/02754

§ 371 Date: Feb. 19, 1999

§ 102(e) Date: Feb. 19, 1999

(87) PCT Pub. No.: WO98/58188

PCT Pub. Date: Dec. 23, 1998

(30) Foreign Application Priority Data

Jun. 19, 1997 (JP) ................................................ 9-162488

(51) Int. Cl.[7] ................................................ B60K 41/22
(52) U.S. Cl. ........................... 192/3.58; 192/3.62; 192/83
(58) Field of Search ............................. 192/3.58, 3.62, 192/83, 3.57, 3.55

(56) References Cited

U.S. PATENT DOCUMENTS

| | | | |
|---|---|---|---|
| 4,280,604 | * | 7/1981 | Lambico ........................ 192/3.58 X |
| 4,505,364 | * | 3/1985 | Goucher et al. .................... 192/3.58 |
| 4,589,532 | * | 5/1986 | Ito et al. ........................ 192/3.57 X |
| 5,002,166 | * | 3/1991 | Leigh-Monstevens et al. .... 192/3.58 X |
| 5,277,290 | * | 1/1994 | Lasoen ........................... 192/3.62 X |

FOREIGN PATENT DOCUMENTS

| | | |
|---|---|---|
| 324 553 | 7/1989 | (EP) . |
| 1-216124 | 8/1989 | (JP) . |
| 3-229020 | 10/1991 | (JP) . |
| 9-79374 | 3/1997 | (JP) . |

* cited by examiner

*Primary Examiner*—Rodney H. Bonck
*Assistant Examiner*—Saúl Rodríguez
(74) *Attorney, Agent, or Firm*—Rader, Fishman & Grauer PLLC

(57) ABSTRACT

An apparatus for engaging and disengaging a clutch, which is applicable to a vehicle provided with a so-called semiautomatic clutch, and which can prevent occurrence of an engagement shock and jerky acceleration of a vehicle when an automatic engaging and disengaging mode and a manual engaging and disengaging mode are switched from one to the other. The apparatus includes a manual disconnection/connection device (2) for manually engaging and disengaging the clutch (1) by operating a clutch pedal (9), an automatic disconnection/connection device (3) for automatically engaging and disengaging the clutch (1) in accordance with a predetermined input signal, and switching control device (14) for switching between a manual engaging and disengaging mode and an automatic engaging and disengaging mode after the clutch (1) has been engaged. This post-engagement switching operation can prevent an engagement shock during the same operation.

15 Claims, 4 Drawing Sheets

APPARATUS FOR ENGAGING AND DISENGAGING CLUTCH

FIELD OF THE INVENTION

The present invention generally relates to an apparatus for disengaging (disconnecting) and engaging (connecting) a clutch, and more particularly to such an apparatus which can realize automatization of vehicle's clutch operation.

BACKGROUND ART

Conventionally, a so-called automatic clutch is known which combines an actuator with a friction clutch such that the clutch is automatically disconnected and connected.

However, a vehicle only equipped with the automatic clutch cannot run when the system is broken. Further, the following fail-safe measure is only available: the clutch is automatically disconnected, connected or maintained in the present condition when the system becomes out of order.

In consideration of the above, a so-called semi-automatic clutch is proposed to overcome the above shortcomings. By using the semi-automatic clutch, manual disconnection and connection of a clutch with a clutch pedal is also made available in addition to the automatic disconnection and connection (Japanese Utility Model Application, Laid-Open Publication No. 6-8825).

Incidentally, the semi-automatic clutch has a problem of interference between the automatic disconnection/connection and manual disconnection/connection when the automatic clutch operation is switched to the manual operation or vice versa. For example, if the one (automatic or manual) clutch disconnection/connection mode is switched to the other mode while the clutch disconnection is proceeding in the above-mentioned one mode, a clutch may immediately be brought into a connecting condition thereby causing a connection shock and unexpectedly rapid acceleration of a vehicle.

An object of the present invention is to provide a clutch disconnection/connection apparatus which can prevent occurrence of a connection shock and accidental acceleration of a vehicle when the switching between the automatic disconnection/connection mode and the manual disconnection/connection mode takes place.

SUMMARY OF THE INVENTION

A clutch disconnection/connection apparatus according to the present invention includes a manual disconnection/connection means for carrying out manual clutch disconnection and connection upon operation of a clutch pedal, an automatic clutch disconnection/connection means for performing automatic clutch disconnection and connection upon receiving a predetermined signal, and a switching control means for causing the switching between the manual disconnection/connection mode and the automatic disconnection/connection mode after clutch connection is completed.

According to this construction, the clutch mode switching is allowed to take place after the clutch connection is finished. Therefore, a shock upon clutch connection and unintentional acceleration of the vehicle would not occur.

BEST MODE FOR CARRYING OUT THE INVENTION

Now, a preferred embodiment of the present invention will be described in detail in reference to the accompanying drawings.

Figure 1:
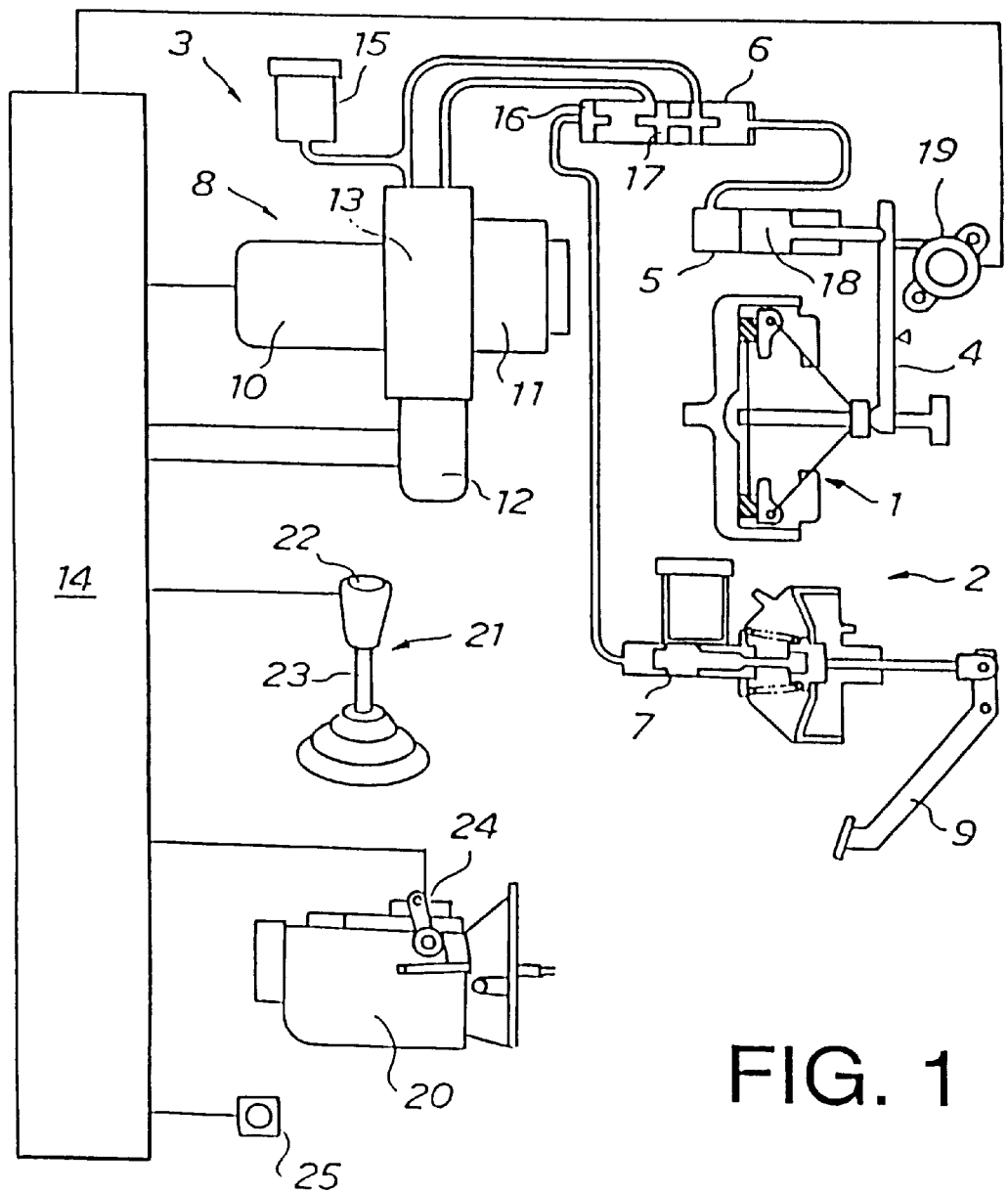
FIG. 1 illustrates an overall view of a clutch disconnection/connection apparatus according to the present invention.

As shown in FIG. 1, a clutch disconnection/connection apparatus of the invention has a structure of a so-called semi-automatic clutch apparatus. Specifically, a clutch 1 is a friction clutch, and this clutch is manually disconnected and connected by a manual disconnection/connection means 2 or automatically disconnected and connected by an automatic disconnection/connection means 3.

The clutch 1 is disconnected and connected as a clutch withdrawal fork (clutch release) 4 is moved back and forth by a slave cylinder (actuator) 5. An appropriate oil pressure or pressurized fluid is fed from a switching cylinder 6 to the slave cylinder 5 for actuation of the slave cylinder. The switching cylinder 6 selectively accepts an oil fed from a master cylinder 7 or an oil fed from an oil pressure source 8 by a switching operation, and supplies to the slave cylinder 5 an oil pressure (pressurized fluid) equal to that the switching cylinder 6 has received. The master cylinder 7 generates an oil pressure according to a stamping movement of a clutch pedal 9 and feeds it to the switching cylinder 6. The oil pressure source 8 includes a motor 10, a hydraulic pump 11, an electromagnetic valve 12 and a relief valve 13. This oil pressure source 8 receives an actuation power and control signal from an electronic control unit 14 and generates a particular oil pressure. A supplemental oil tank 15 is connected to an oil pipe extending from the oil pressure source 8 to the switching cylinder 6.

According to the described and illustrated construction, an oil pressure is generated by the master cylinder 7 as the clutch pedal 9 is depressed. This oil pressure or pressurized fluid causes pistons 16 and 17 to move in the switching cylinder 6, and in turn causes the switching cylinder 6 to feed an oil pressure, which corresponds to clutch pedal depression, to the slave cylinder 5. Then, a piston 18 is pushed in the slave cylinder 5, and as a result, the clutch 1 is operated in a disconnecting direction by an amount corresponding to clutch pedal stamping. Conversely, when the clutch pedal 9 is moved back or released, the clutch 1 is operated in the connecting direction. In this manner, the clutch manual disconnection and connection is attained. Thus, the clutch pedal 9, master cylinder 7, switching cylinder 6 and slave cylinder 5 constitute in combination the manual clutch disconnection/connection means 2.

In the meanwhile, a movement or stroke of the clutch 1 is always monitored by a clutch stroke sensor 19. In the illustrated embodiment, a common manual transmission 20 is also provided which is mechanically operated by a shift lever 21. Specifically, a shift lever 21 and transmission 20 are operatively connected to each other by way of mechanical elements such as links, wires and cables so that they operate in a cooperative manner. The shift lever 21 has a nob 22 which can shake like a head relative to a shift lever shaft 23. When the nob 22 is caused to shake by a shifting force applied from a driver who attempts to change a shift position, a contact inside the nob 22 is touched so that an electric signal is produced. The transmission 20 is equipped with a neutral switch 24 to detect whether it is in a neutral condition or not. Signals of the sensor and switch are fed to the control unit 14.

The control unit 14 performs the automatic disconnection and connection of the clutch 1 upon receiving an electric signal from the shift lever 21. Specifically, if the shift lever 21 is operated for shift position change while a vehicle is running, clutch disconnection is initiated upon gear disengagement, and clutch connection is started upon gear engagement. This clutch disconnection and connection is carried out by controlling the oil pressure generated in the oil pressure source 8. Specifically, the oil pressure source 8 operates like the master cylinder 7, and when a certain oil pressure or pressurized fluid is generated by the oil pressure source 8, the clutch 1 is disconnected by a stroke corresponding to the generated oil pressure, like the manual disconnection. When the clutch is connected, a connection speed of the clutch 1 is controlled or selected according to a vehicle's running condition. A plurality of connection speeds are already memorized in the control unit 14. In this manner, the control unit 14, pressurized fluid source 8, switching cylinder 6 and slave cylinder 5 constitute in combination the automatic disconnection/connection means 3.

Incidentally, a changeover switch 25 is connected to the control unit 14 for the switching between the manual disconnection/connection and the automatic disconnection/connection. This changeover switch 25 is located in a vehicle's compartment so that it is manually operated by a driver. If the changeover switch 25 is in a position for the manual disconnection/connection mode, the pressurized fluid source 8 does not feed the oil pressure. If the changeover switch 25 is in a position for the automatic disconnection/connection mode, then the oil pressure source 8 feeds the oil pressure according to the electrical signal from the shift lever 21.

Figure 2A:
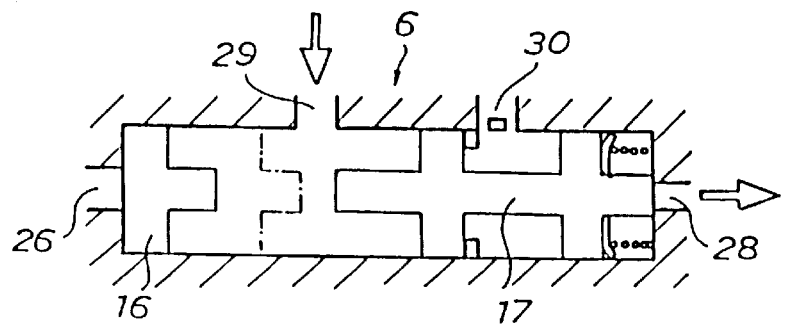
FIG. 2A illustrates an elevational cross section of a switching cylinder when automatic disconnection is proceeding.
Figure 2B:
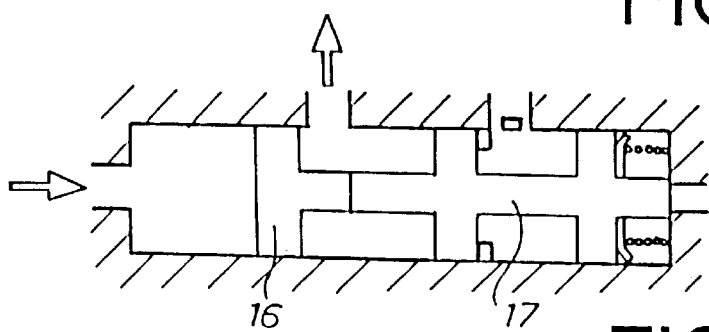
FIG. 2B is a similar cross sectional view of the switching cylinder when a clutch pedal is stamped during automatic clutch disconnection.
Figure 3A:
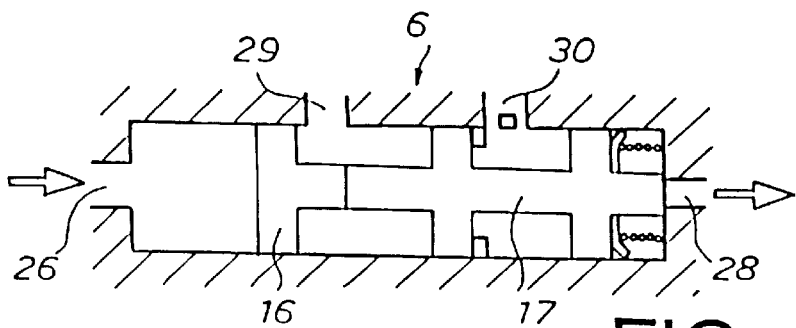
FIG. 3A is an elevational cross section of the switching cylinder when manual disconnection is proceeding.

FIGS. 2A, 2B, 3A and 3B illustrate the structure of the switching cylinder 6 in detail. The switching cylinder 6 is filled with the oil and has the first and second pistons 16 and 17 arranged in tandem inside thereof. When the oil pressure is fed from the master cylinder 7, as illustrated in FIG. 3A, the oil pressure is introduced into a cylinder chamber from a first port 26 thereby pushing both of the pistons 16 and 17, and therefore the oil is forced out from an exit port 28 toward the slave cylinder 5. On the other hand, when the oil pressure is fed from the oil pressure source 8, as shown in FIG. 2A, the oil pressure is introduced into the cylinder chamber from a second port 29 thereby pushing the second piston 17 toward the exit port 28 and the first piston 16 in the opposite direction. An oil is then forced out from the exit port 28 to the slave cylinder 5. In this manner, disconnection of the clutch 1 is made possible. It should be noted that a third port 30 is a port for receiving an additional oil from the supplemental tank 15.

It should be considered here whether the illustrated apparatus has a problem of interference between the manual mode and automatic mode. For example, during the automatic clutch disconnection shown in FIG. 2A, an oil pressure is supplied between the first and second pistons 16 and 17 so that the pressure in that part is raised. In this situation, if the changeover switch 25 is turned off to perform the manual operation, the electromagnetic valve 12 of the oil pressure source 8 is switched over and the oil pressure is maintained. Further, if the clutch pedal 9 is stamped, the oil between the first and second pistons 16 and 17 is forced to flow back through the second port 29 due to volumetric reduction as shown in FIG. 2, and is discharged from the relief valve of the oil pressure source 8. No problem would occur if an amount of clutch pedal stamping is sufficiently large to cause the first piston 16 to abut against the second piston 17. However, if the clutch pedal 9 is not stamped to such an amount and therefore the first piston 16 is only moved to a midway as indicated by the phantom line in FIG. 2A, then the second piston 17 will not return completely upon releasing of the clutch pedal 9. If the second piston 17 does not return completely, it raises a problem that the clutch 1 is not connected completely. A similar trouble possibly occurs if the switching over takes place while disconnection or connection of the clutch 1 is proceeding.

Figure 3B:
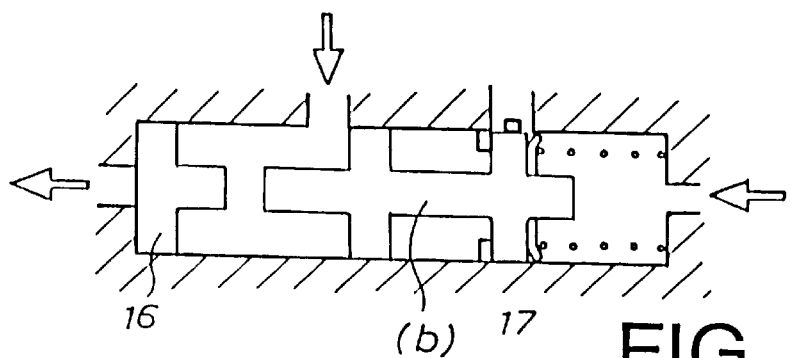
FIG. 3B is a similar cross sectional view of the switching cylinder when clutch pedal release and automatic clutch disconnection take place simultaneously.

During manual disconnection of the clutch as shown in FIG. 3A, the oil pressure between the first piston 16 and first port 26 is raised. In this situation, it should be assumed that the changeover switch 25 is turned on to perform the automatic operation, and the shift lever 21 is operated and the clutch pedal 9 is released. Then, as illustrated in FIG. 3B, the oil is introduced between the first and second pistons 16 and 17 for clutch disconnection, but if the oil is discharged from the first port 26 at a high speed which exceeds the oil introduction speed, then the second piston 17 is rapidly returned and the clutch 1 is suddenly connected. This may cause a clutch connection shock and result in unexpected acceleration of a vehicle. A similar problem possibly occurs when the changeover takes place while the clutch disconnection or connection is proceeding.

The apparatus of the present invention eliminates the above problems by executing the following control.

Figure 4:
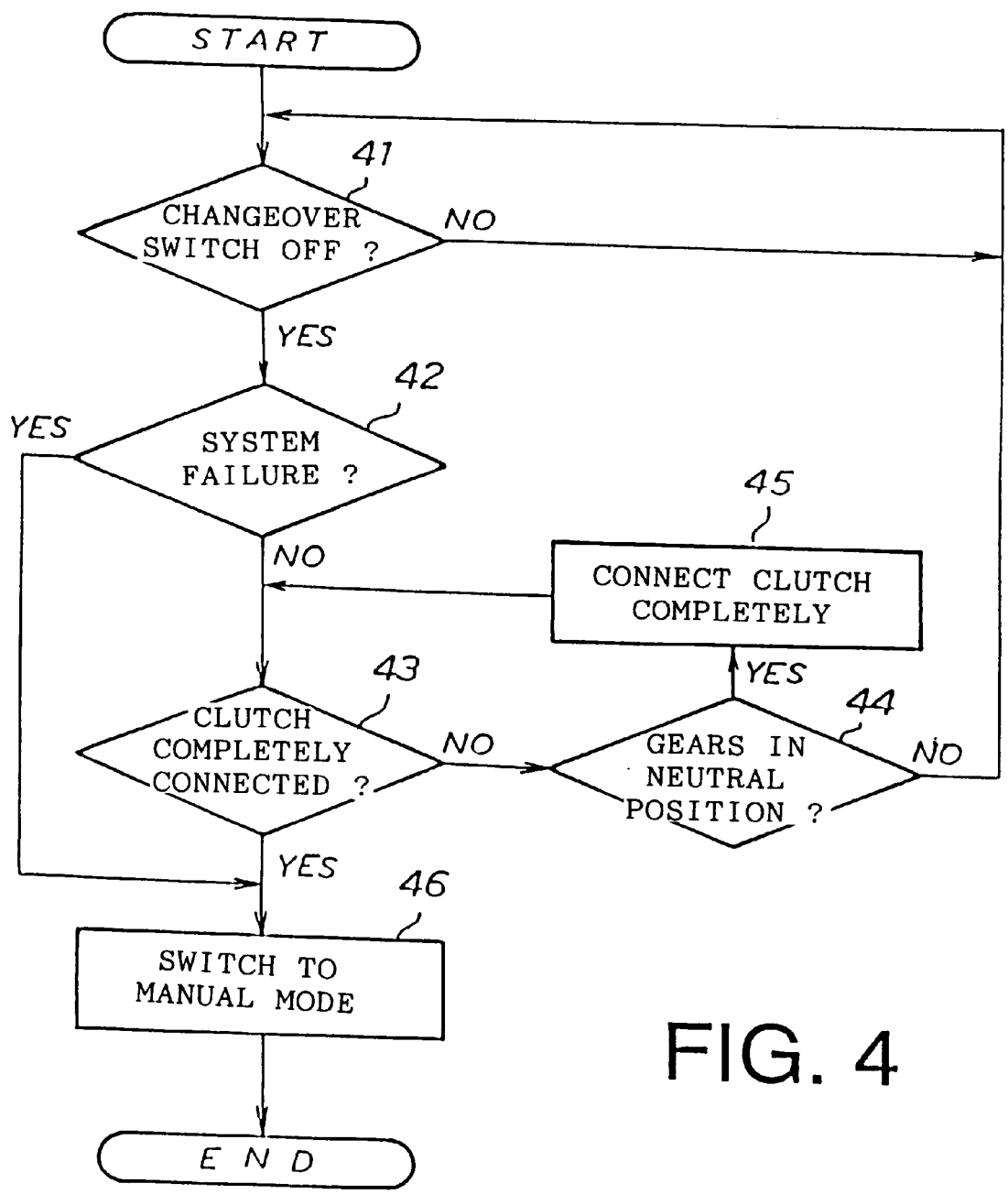
FIG. 4 illustrates a flowchart for control when the automatic disconnection/connection mode is switched to the manual disconnection/connection mode according to the present invention.
Figure 5:
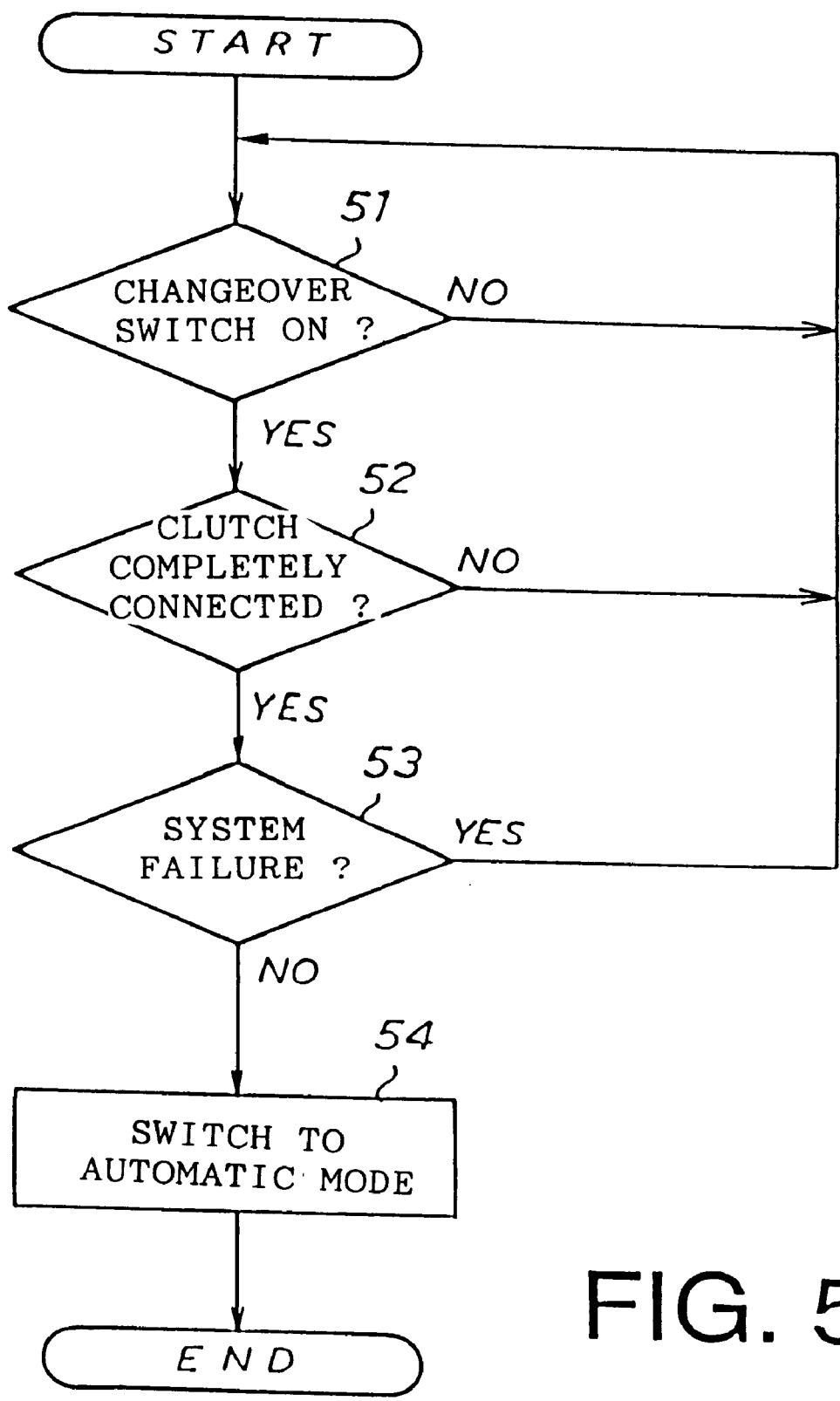
FIG. 5 illustrates another flowchart for the present invention apparatus when the manual mode is switched to the automatic mode.

FIGS. 4 and 5 illustrate flowcharts to be executed by the control unit 14 for the present invention apparatus. Specifically, FIG. 4 shows the control when the automatic clutch disconnection/connection mode is switched to the manual clutch disconnection/connection mode, and FIG. 5 shows the control when the manual mode is switched to the automatic mode.

Referring first to FIG. 4, it is determined at Step 41 whether or not the changeover switch 25 is off. If it is on, the desired clutch mode is the automatic mode so that the program returns to Step 41. If it is off, the desired clutch mode is the manual mode so that the program advances to Step 42 to determine whether or not there is system failure.

The system failure means that the automatic operation is disabled due to sensor failure or the like. In this condition, if the switching to the automatic operation takes place, a vehicle will possibly be accelerated suddenly in an unexpected manner. The system failure is detected when the control unit 14 receives an abnormal signal. In such a situation, a driver is informed of such failure by an indicator lamp and/or buzzer. Even if the driver does not operate the switch 25 to change to the manual mode or mistakenly selects the automatic mode after the system failure has occurred, the control unit 14 has detected the system failure so that it is possible to avert danger: if it is determined that there is a system failure, the program immediately proceeds to Step 46 to switch into the manual mode, and the control to the oil pressure source 8 is terminated.

On the other hand, if it is determined at Step 42 that the system is operating appropriately, then the program goes to Step 43 to determine, based on an output signal of the clutch stroke sensor 19, whether the clutch 1 is in a completely connected condition. If the clutch 1 is completely connected, the program immediately proceeds to Step 46 and the clutch operation mode is changed to the manual mode. Subsequently, controlling the oil pressure source 8 is stopped. If the clutch 1 is not connected completely, i.e., if the clutch 1 is in a completely disconnected condition or half-connected condition, the program advances to Step 44 to determine whether the transmission 20 is in a neutral condition. If the transmission 20 is in the neutral condition, the program proceeds to Step 45 to perform a control for complete connection of the clutch 1. If clutch complete connection is confirmed at Step 43 while these circulating steps are being executed, the program then advances to Step 46 thereby switching into the manual mode and stopping controlling the oil pressure source 8.

The clutch connection is only performed when the transmission is in the neutral condition because it prevents unintentional acceleration of the vehicle upon clutch connection. If the transmission is not in the neutral condition, the program goes to Start of the flowchart and maintains the automatic mode.

In this manner, changeover from the automatic mode to the manual mode is made possible as long as the clutch is completely connected, regardless of gear engagement/disengagement in the transmission 20. If the gears are engaged in the transmission 20 and the clutch 1 is not connected completely, the automatic mode is maintained. If the gears are not engaged in the transmission 20 and the clutch 1 is not connected completely, the clutch 1 is automatically brought into the complete connection condition.

Referring now to FIG. 5, when the manual mode is changed to the automatic mode, it is first determined at Step 51 whether the changeover switch 25 is on. If it is on, the desired mode is the automatic mode so that the program proceeds to Step 52. Then, it is determined whether the clutch is completely connected. If the answer is yes, the program goes to Step 53 to determine whether a system failure is occurring. If the system is operating normally, the program advances to Step 54 to perform the switching to the automatic mode and initiates controlling the oil pressure source 8. If the desired mode is determined to be a manual mode at Step 51, the clutch is determined not to be completely connected at Step 52 or the system failure is determined to exist at Step 53, then the program returns to Start of the flowchart and maintains the manual mode.

In this manner, the switching to the automatic mode from the manual mode is made possible as long as the clutch 1 is completely connected regardless of gear engagement/disengagement in the transmission 20, and is made impossible when the clutch 1 is not completely connected.

As understood from the above, the control unit 14 is a switchover control means for executing the switching between the manual clutch disconnection/connection and the automatic clutch disconnection/connection after the clutch 1 is connected. By employing the control unit 14, the clutch operation mode is not allowed to switch until the clutch 1 is connected, so that it is feasible to completely prevent occurrence of a clutch connection shock and unintentional acceleration of vehicle upon switching of the clutch operation mode. Further, one mode does not interfere with the other mode. For example, even if the changeover switch 25 is turned off (switching to the manual mode) and the clutch pedal 9 is operated during automatic clutch disconnection, the oil is merely discharged according to the movement of the clutch pedal, and the controlling itself is not affected.

Moreover, according to the prevent invention apparatus, the clutch operation is automatized by a simple structure, and the apparatus is easily obtained by adding the slave cylinder 5 and other parts to an existing manual-transmission vehicle. In short, the present invention is applicable to a wide variety of cars. In this case, a bracket may be attached to a clutch housing, and then the slave cylinder 5 and clutch stroke sensor 19 may be mounted onto the bracket.

Although the present invention has been described and illustrated in the form of a preferred embodiment, modifications and changes may be made without departing from the spirit and scope of the present invention defined in the appended claims.

INDUSTRIAL APPLICABILITY

The present invention is applicable to vehicles having a so-called semi-automatic clutch apparatus.

What is claimed is:

1. A clutch disconnection and connection apparatus comprising:
    manual disconnection/connection means for disconnecting and connecting a clutch upon a stamping/releasing operation of a clutch pedal;
    automatic disconnection/connection means for automatically disconnecting and connecting the clutch upon receiving a particular signal; and
    changeover control means for performing switching between manual clutch disconnection/connection and automatic clutch disconnection/connection after connection of the clutch is finished.

2. The clutch disconnection and connection apparatus of claim 1 further including a manual changeover switch, and wherein the changeover control means includes an electronic control unit, and performs the switching between the manual and automatic clutch disconnection/connection based on a signal sent from the manual changeover switch.

3. The clutch disconnection and connection apparatus of claim 1, wherein the changeover control means maintains the automatic clutch disconnection/connection until a transmission is brought into a neutral condition and the clutch is automatically connected, if the clutch has not been connected automatically when the changeover control means performs the switching to the manual clutch disconnection/connection from the automatic clutch disconnection/connection.

4. The clutch disconnection and connection apparatus of claim 1, wherein the changeover control means determines whether automatic clutch disconnection/connection is disabled or not when it attempts to perform the switching between the manual and automatic clutch disconnection/connection, and performs the switching between the manual and automatic clutch disconnection/connection only when it determines that the automatic clutch disconnection/connection can function normally.

5. The clutch disconnection and connection apparatus of claim 2, wherein the manual clutch disconnection/connection means includes a master cylinder for generating pressurized fluid which corresponds to an amount of the stamping/releasing operation of the clutch pedal, the automatic clutch disconnection/connection means includes an electronic control unit, which is shared by the changeover control means, and a pressurized fluid source for generating pressurized fluid upon receiving a signal from the electronic control unit, and both the manual and automatic clutch disconnection/connection means include a mutual changeover cylinder for selecting one of the pressurized fluid sent from the master cylinder and pressurized fluid source and for generating pressurized fluid which corresponds to selected pressurized fluid, and mutual slave cylinder for actuating the clutch based on the hydraulic pressure sent from the changeover cylinder.

6. The clutch disconnection and connection apparatus of claim 5, wherein the pressurized fluid source includes a motor, a hydraulic pump, an electromagnetic valve and a relief valve, and generates predetermined pressurized fluid as it receives an actuation power and a control signal from the electronic control unit.

7. The clutch disconnection and connection apparatus of claim 5, wherein the changeover cylinder includes two pistons therein, and both the pistons are moved upon receiving the pressurized fluid from the master cylinder whereas one of the pistons closer to an exit port of the changeover cylinder is only moved upon receiving the pressurized fluid from the pressurized fluid source.

8. The clutch disconnection and connection apparatus of claim 5, wherein the pressurized fluid is an oil pressure.

9. The clutch disconnection and connection apparatus of claim 1, wherein the apparatus is combined with a manual transmission which is operated according to a shift lever manually operated by a driver, and the shift lever generates an electric signal when it receives a shifting force derived from the operated shift lever, and the automatic disconnection/connection means performs automatic clutch disconnection and connection upon receiving this electric signal.

10. A method comprising the step of performing switching between a manual clutch disconnection/connection mode and an automatic clutch disconnection/connection mode after detecting complete connection of a clutch.

11. The method of claim 10 further including the steps of:
determining whether the clutch has been connected automatically if the automatic clutch disconnection/connection mode has been selected; and
maintaining the automatic clutch disconnection/connection mode until a transmission is brought into a neutral condition and the clutch is automatically connected if it is determined that the clutch has not been connected yet in spite of a command for switching to the manual clutch disconnection/connection mode from the automatic clutch disconnection/connection.

12. The method of claim 10 further including the steps of:
determining whether automatic clutch disconnection/connection is disabled or not when the switching between the manual and automatic clutch disconnection/connection modes is performed; and
performing the switching between the manual and automatic clutch disconnection/connection modes only when it determines that the automatic clutch disconnection/connection mode can function normally.

13. A method comprising the steps of:
providing manual disconnection/connection means for disconnecting and connecting a clutch upon a stamping/releasing operation of a clutch pedal;
providing automatic disconnection/connection means for automatically disconnecting and connecting the clutch upon receiving a particular signal; and
providing means for performing switching between manual clutch disconnection/connection and automatic clutch disconnection/connection after connection of the clutch is finished.

14. The method of claim 13 further including the steps of:
determining whether the clutch has been connected automatically when an automatic clutch disconnection/connection mode is selected; and
maintaining the automatic clutch disconnection/connection mode until a transmission is brought into a neutral condition and the clutch is automatically connected if it is determined that the clutch has been connected yet in spite of a command to switch to a manual clutch disconnection/connection mode from the automatic clutch disconnection/connection mode.

15. The method of claim 14 further including the steps of:
determining whether automatic clutch disconnection/connection is disabled or not when the switching between the manual and automatic clutch disconnection/connection is performed; and
performing the switching between the manual and automatic clutch disconnection/connection modes only when it determines that the automatic clutch disconnection/connection mode can function normally.

* * * * *